(12) United States Patent
Segawa et al.

(10) Patent No.: US 7,152,201 B2
(45) Date of Patent: Dec. 19, 2006

(54) WRITE CONTROL METHOD, STRUCTURED DOCUMENT MANAGEMENT APPARATUS, STRUCTURED DOCUMENT EDIT APPARATUS, AND PROGRAM PRODUCT

(75) Inventors: Junichi Segawa, Yokohama (JP); Tetsuro Kimura, Tama (JP); Osamu Torii, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 618 days.

(21) Appl. No.: 10/151,138

(22) Filed: May 21, 2002

(65) Prior Publication Data
US 2004/0019879 A1    Jan. 29, 2004

(30) Foreign Application Priority Data
May 21, 2001    (JP)    ............... 2001-151604

(51) Int. Cl.
*G06F 15/00*    (2006.01)
*G06F 17/00*    (2006.01)
(52) U.S. Cl. ............... 715/511; 715/513; 707/8; 707/9; 709/205
(58) Field of Classification Search ............... 715/511, 715/513; 709/205; 711/152; 707/8, 9
See application file for complete search history.

(56) References Cited

U.S. PATENT DOCUMENTS 5,220,657 A * 6/1993 Bly et al. ............... 711/152
5,446,842 A * 8/1995 Schaeffer et al. ............... 709/205
5,890,177 A * 3/1999 Moody et al. ............... 715/511
6,061,697 A   5/2000 Nakao

FOREIGN PATENT DOCUMENTS

JP    2001-527242    12/2001

OTHER PUBLICATIONS

Whitehead. James E. Jr., World Wide Web authoring and versioning (WebDAV): an introduction, ACM Press, 1997, vol. 5, Issue 1, pp. 3-8.*
Jun'ichi Segawa, et al. "The Information Management System Based on XML Bidirectional Transformation Technology" Proceedings of Pan-Yellow-Sea International Workshop on Information Technologies for Network Era, Mar. 2002, 8 pages.

* cited by examiner

*Primary Examiner*—William Bashore
(74) *Attorney, Agent, or Firm*—Oblon, Spivak, McClelland, Maier & Neustadt, P.C.

(57) ABSTRACT

A write control method of exclusively controlling write requests from a plurality of user terminals to an identical structured document is disclosed. The identical structured document includes a plurality of elements each containing document content. A monitor field is set in units of the elements within the identical structured document. Upon accepting one write request from one user terminal, it is determined if the one write request is directed to the document content under monitoring by referral to the monitor field. Then, the one write request is handled to reject overwriting of the document content despite the one write request if the document content has been rewritten by another write request from another user terminal in advance.

9 Claims, 25 Drawing Sheets

| | |
|---|---|
| 1 | `<address_book>` |
| 2 | `    <member monitor_field="true">` |
| 3 | `        <name>Taro Yamada</name>` |
| 4 | `        <mail>yamadae taiyo-tusin.com</mail>` |
| 5 | `        <office>Taiyo Tusin</office>` |
| 6 | `    </member>` |
| 7 | `    <member monitor_field="true">` |
| 8 | `        <name>Hanako Suzuki</name>` |
| 9 | `        <mail>hanako@kanagawa-gass.com</mail>` |
| 10 | `        <office>Kanagawa Gas</office>` |
| 11 | `    </member>` |
| 12 | `</address_book>` |

```
1   <address_book>
2   	<member monitor_field="true" Last_write_time="2001/3/3 10:23">
3   		<name>Taro Yamada</name>
4   		<mail>yamada@taiyo-tusin.com</mail>
5   		<office>Taiyo Tusin</office>
6   	</member>
7   	<member monitor_field="true" Last_write_time="2001/3/3 10:23">
8   		<name>Hanako Suzuki</name>
9   		<mail>hanako@kanagawa-gass.com</mail>
10  		<office>Kanagawa Gas</office>
11  	</member>
12  </address_book>
```

FIG. 7

Correspondence table

| Document structure | monitor field designation data |
|---|---|
| address book | monitor field=address book/member |
| Schedule | monitor field=schedule/Item |
|  |  |

FIG. 8

```
<Schedule>
  <Item>
    <Date>2001/5/10</Date>
    <Time>13:00-15:00</Time>
    <Subject>Staff meeting</Subject>
    <Place>Third meeting room</Place>
    <Body>
        Report about schedule in May
    </Body>
  </Item>

<Item>
    <Date>2001/6/5</Date>
    <Time>9:00</Time>
    <Subject>Staff meeting</Subject>
    <Place>Second meeting room</Place>
    <Body>
        Report about schedule in June
        Discuss products scheduled to be released in this term
    </Body>
  </Item>

<Item>
    <Date>2001/6/12</Date>
    <Time>8:00-17:00</Time>
    <Subject>Mr. Yamada outing</Subject>
    <Place> - - </Place>
    <Body>
        Mr. Yamada is not in company all day due to OJT
        Call 000-000-0000 to contact him
    </Body>
  </Item>
</Schedule>
```

FIG. 9

| | |
|---|---|
| 1 | Type of edit : |
| 2 |   Rewrite |
| 3 | Objective field : |
| 4 |   <member monitor_field="true" Last_write_time="2001/3/3 10:23"> |
| 5 |     <name>Hanako Suzuki</name> |
| 6 |     <mail>hanako@kanagawa-gass.com</mail> |
| 7 |     <office>Kanagawa Gas</office> |
| 8 |   </member> |
| 9 | Change Contents : |
| 10 |   <member monitor_field="true" Last_write_time="2001/3/3 10:23"> |
| 11 |     <name>Hanako Ogawa</name> |
| 12 |     <mail>hanako@kanagawa-gass.com</mail> |
| 13 |     <office>Kanagawa Gas</office> |
| 14 |   </member> |

FIG. 13

| 1 | Type of edit : |
|---|---|
| 2 | Add |
| 3 | Change Contents : |
| 4 | <member> |
| 5 | <name>Hajime Tanaka</name> |
| 6 | <mail>tanaka@kanto.system.com</mail> |
| 7 | <office>Kanto System</office> |
| 8 | </member> |

FIG. 14

| 1 | Type of edit : |
|---|---|
| 2 | Delete |
| 3 | Objective field : |
| 4 | <member monitor_field="true" Last_write_time="2001/3/3 10:23"> |
| 5 | <name>Hanako Suzuki</name> |
| 6 | <mail>hanako@kanagawa-gass.com</mail> |
| 7 | <office>Kanagawa Gas</office> |
| 8 | </member> |

FIG. 15

| | Document data : address book A |
|---|---|
| 1 | Write objective field : |
| 2 |   <member monitor_field="true" Last_write_time="2001/3/3 10:23"> |
| 3 |     <name>Hanako Suzuki</name> |
| 4 |     <mail>hanako@kanagawa-gass.com</mail> |
| 5 |     <office>Kanagawa Gas</office> |
| 6 |   </member> |
| 7 | Write contents : |
| 8 |   <member monitor_field="true" Last_write_time="2001/3/3 10:23"> |
| 9 |     <name>Hanako Ogawa</name> |
| 10 |     <mail>hanako@kanagawa-gass.com</mail> |
| 11 |     <office>Kanagawa Gas</office> |
| 12 |   </member> |

FIG. 16

```
1   <address_book>
2       <member monitor_field="true" Last_write_time="2001/3/3 10:23">
3           <name>Taro Yamada</name>
4           <mail>yamada@taiyo-tusin.com</mail>
5           <office>Taiyo Tusin</office>
6       </member>
7       <member monitor_field="true" Last_write_time="2001/3/3 12:21">
8           <name>Hanako Ogawa</name>
9           <mail>hanako@kanagawa-gass.com</mail>
10          <office>Kanagawa Gas</office>
11      </member>
12  </address_book>
```

FIG. 18

| | Document data : address book A |
|---|---|
| 1 | Write objective field : |
| 2 |   <member field="true" Last_write_time="2001/3/3 10:23"> |
| 3 |     <name>Taro Yamada</name> |
| 4 |     <mail>yamada@taiyo-tusin.com</mail> |
| 5 |     <office>Taiyo Tusin</office> |
| 6 |   </member> |
| 7 | Write contents : |
| 8 |   <member field="true" Last_write_time="2001/3/3 10:23"> |
| 9 |     <name>Taro Yamada</name> |
| 10 |     <mail>yamada@taiyo-tusin.com</mail> |
| 11 |     <office>Taiyo Tusin inc.</office> |
| 12 |   </member> |

FIG. 20

| | Document data : address book A |
|---|---|
| 1 | Write objective field : |
| 2 | <member field="true" Last_write_time="2001/3/3 10:23"> |
| 3 | <name>Taro Yamada</name> |
| 4 | <mail>yamada@taiyo-tusin.com</mail> |
| 5 | <office>Taiyo Tusin</office> |
| 6 | </member> |
| 7 | Write contents : |
| 8 | <member field="true" Last_write_time="2001/3/3 10:23"> |
| 9 | <name>Taro Yamada</name> |
| 10 | <mail>yamada@taiyo-communicate.com</mail> |
| 11 | <office>Taiyo Tusin</office> |
| 12 | </member> |

FIG. 21A

| | Document data : address book A |
|---|---|
| 1 | Write objective field : |
| 2 | <member field="true" Last_write_time="2001/3/3 10:23"> |
| 3 | <name>Hanako Suzuki</name> |
| 4 | <mail>hanako@kanagawa-gass.com</mail> |
| 5 | <office>Kanagawa Gas</office> |
| 6 | </member> |
| 7 | Write contents : |
| 8 | <member field="true" Last_write_time="2001/3/3 10:23"> |
| 9 | <name>Hanako Suzuki</name> |
| 10 | <mail>hanako@yokohama-gass.com</mail> |
| 11 | <office>Yokohama Gas</office> |
| 12 | </member> |

FIG. 21B

```
1   <address_book>
2       <member monitor_field="true" Last_write_time="2001/3/3 11:10">
3           <name>Taro Yamada</name>
4           <mail>yamada@taiyo-tusin.com</mail>
5           <office>Taiyo Tusin Inc.</office>
6       </member>
7       <member monitor_field="true" Last_write_time="2001/3/3 10:23">
8           <name>Hanako Suzuki</name>
9           <mail>hanako@kanagawa-gass.com</mail>
10          <office>Kanagawa Gas</office>
11      </member>
12  </address_book>
```

FIG. 22

```
1  <address_book>
2  <member>
3  <name monitor_field="true" Last_write_time="2001/3/3 10:10">Taro Yamada</name>
4  <mail monitor_field="true" Last_write_time="2001/3/3 10:10">yamada@taiyo-tusin.com</mail>
5  <company monitor_field="true" Last_write_time="2001/3/3 10:10">
6  <company_name>Taiyo Tusin</company_name>
7  <department_name>First business department</department_name>
8  </company>
9  </member>
10 <member>
11 <name monitor_field="true" Last_write_time="2001/3/3 10:10">Hanako Suzuki</name>
12 <mail monitor_field="true" Last_write_time="2001/3/3 10:10">hanako@kanagawa-gass.com</mail>
13 <company monitor_field="true" Last_write_time="2001/3/3 10:10">
14 <company_name>Yokohama Gas</company_name>
15 <department_name>Department of general affairs</department_name>
16 </company>
17 </member>
18 </address_book>
```

F I G. 23

| | |
|---|---|
| 1 | Objective field : |
| 2 |    <company monitor_field="true" Last_write_time="2001/3/3 10:10"> |
| 3 |      <company_name>Taiyo Tusin</company_name> |
| 4 |      <department_name>First business department</department_name> |
| 5 |    </company> |
| 6 | Change Contents : |
| 7 |    <company monitor_field="true" Last_write_time="2001/3/3 10:10"> |
| 8 |      <company_name>Nihon Tusin</company_name> |
| 9 |    </company> |

F I G. 24

```
<address_book>
    <member>
        <name>Taro Yamada</name>
        <mail>yamadae taiyo-tusin.com</mail>
        <office>Taiyo Tusin</office>
    </member>
    <member>
        <name>Hanako Suzuki</name>
        <mail>hanako@yokohama-gass.com</mail>
        <office>Kanagawa Gas</office>
    </member>
</address_book>
```

FIG. 25

Correspondence table

| Document structure | Monitor field designation data |
|---|---|
| Address book | Monitor field designation data=address book/member/name<br>Monitor field designation data=address book/member/mail<br>Monitor field designation data=address book/member/office |
| Schedule | Monitor field=Schedule/Item |
|  |  |

FIG. 26

```
1   <address_book>
2   <member>
3   <name monitor_field="true" Last_write_time="2001/3/3 10:23">Taro Yamada</name>
4   <mail monitor_field="true" Last_write_time="2001/3/4 10:10">yamada@nihon-tusin.com</mail>
5   <company_name monitor_field="true" Last_write_time="2001/3/4 10:10">Taiyo Tusin</company_name>
6   </member>
7   <member>
8   <name monitor_field="true" Last_write_time="2001/3/3 10:10">Hanako Suzuki</name>
9   <mail monitor_field="true" Last_write_time="2001/3/3 10:10">hanako@yokohama-gass.com</mail>
10  <company_name monitor_field="true" Last_write_time="2001/3/3 10:10">Kanagawa Gas</company_name>
11  </member>
12  </address_book>
```

FIG. 27

FIG. 29A
| Name | Address | Home telephone number |
|---|---|---|
| Taro Tanaka | Saiwai-ku 3 Kawasaki | 045-522-5300 |
| Hanako Tanaka | Saiwai-ku 3 Kawasaki | 045-522-5300 |
| Kensuke Suzuki | Kohoku-ku 2 Yokohama | 044-233-2200 |
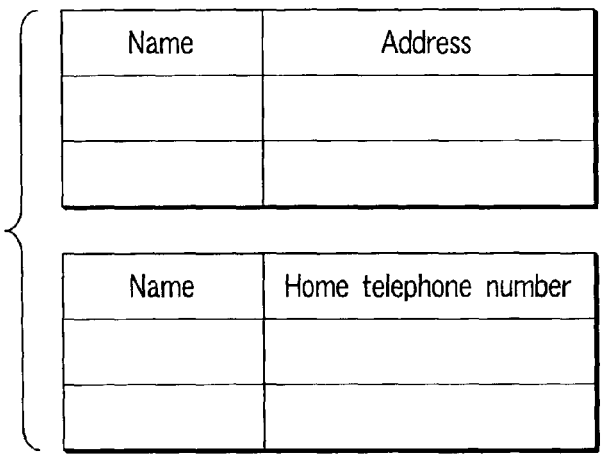
FIG. 29B
FIG. 29C

```xml
<Schedule>
  <Item monitor_filed="true">
    <Date>2001/5/10</Date>
    <Time>13:00-15:00</Time>
    <Subject>Staff meeting</Subject>
    <Place>Third meeting room</Place>
    <Body>
        Report about schedule in May
    </Body>
  </Item>

<Item monitor_filed="true">
    <Date>2001/6/5</Date>
    <Time>9:00</Time>
    <Subject>Staff meeting</Subject>
    <Place>Second meeting room</Place>
    <Body>
        Report about schedule in June
        Discuss products scheduled to be released in this term
    </Body>
  </Item>

<Item monitor_filed="true">
    <Date>2001/6/12</Date>
    <Time>8:00-17:00</Time>
    <Subject>Mr. Yamada outing</Subject>
    <Place>- -</Place>
    <Body>
        Mr. Yamada is not in company all day due to OJT
        Call 000-000-0000 to contact him
    </Body>
  </Item>
</Schedule>
```

FIG. 30

WRITE CONTROL METHOD, STRUCTURED DOCUMENT MANAGEMENT APPARATUS, STRUCTURED DOCUMENT EDIT APPARATUS, AND PROGRAM PRODUCT

CROSS-REFERENCE TO RELATED APPLICATIONS

This application is based upon and claims the benefit of priority from the prior Japanese Patent Application No. 2001-151604, filed May 21, 2001, the entire contents of which are incorporated herein by reference.

BACKGROUND OF THE INVENTION

1. Field of the Invention

The present invention relates to a method, apparatus, and computer program product for controlling write requests from a plurality of users with respect to structured documents stored in a storage that stores a plurality of structured documents with different document structures.

2. Description of the Related Art

In recent years, along with the development of information processing technologies, document data to be processed includes not only document data as a simple character string such as text data, but also document data with prescribed components that form a document such as HTML (Hypertext Markup Language), XML (Extensible Markup Language), and the like.

Some documents such as patent specifications, weekly reports, and the like have predetermined formats, and are standardized to these formats. In addition to such documents that are standardized to given formats, many documents with free formats are also present. Hence, a demand for storage and management of such documents with various formats as structured documents described in XML and the like will be increasing in the future.

A plurality of users may often read out, edit, and write identical document data. If the edit contents from the users are consistent, all write requests should be permitted; if they are inconsistent, such write requests should be denied. Inconsistency of the contents due to a plurality of write accesses is called "conflict".

Since a database is premised on accesses from a plurality of users, means for controlling write accesses from a plurality of users is indispensable. In a conventional relational database, under the condition that relations are designed to satisfy:

First Normal Form
Second Normal Form
Third Normal Form
Fourth Normal Form
Boyce-Codd Normal Form, controls of write requests from a plurality of users are handled with a transaction management in units of tuple. This transaction management denies a plurality of write accesses originated simultaneously to an identical tuple. Specifically, to avoid the "conflict" in units of tuple, the transaction management handles controls of write requests so as to deny another write request during write access to a given tuple.

However, the "conflict" may occur since the relational database does not perform any transaction management in a unit that exceeds tuples.

As another example of a system for controlling write requests from a plurality of users, CVS (Concurrent Versions System) is known.

In the CVS, "line" is fixed as a write unit to each text as document data. If a plurality of write accesses are made to a single line, even when their write contents are independent from each other, the CVS determines them as "conflict".

If the conflict has occurred, the CVS accepts all write requests that caused it, and the CVS then writes a mark indicating occurrence of conflict in document data. The user recognizes the conflict by observing that mark, and issues a new write request by checking the plurality of write contents.

In this way, the "tuple" in the conventional RDB and the "line" in the conventional CVS, which are fixedly set, are used as units to monitor if the conflict occur or not when a plurality of write accesses are requested. Hence, these techniques are not sufficient to be utilized for the above mentioned structured document processing such as XML, to prevent the conflict appropriately.

BRIEF SUMMARY OF THE INVENTION

The present invention has its object to provide a method, apparatus, and computer program product for performing exclusive access control which controls write accesses from a plurality of users with respect to an identical structured document in a flexible manner.

According to the present invention, there is provided a method of exclusively controlling write requests from a plurality of user terminals to an identical structured document, wherein the identical structured document includes a plurality of elements each containing document content, the method comprising: setting a monitor field in units of the elements within the identical structured document; accepting one write request from one user terminal; determining if the one write request is directed to the document content under monitoring by referral to the monitor field; and handling the one write request to reject overwriting of the document content despite the one write request if the document content has been rewritten by another write request from another user terminal in advance.

BRIEF DESCRIPTION OF THE SEVERAL VIEWS OF THE DRAWING

FIG. 7 shows an example of field-designated document data that is stored in a field-designated document data storage unit after a last write time is recorded in a monitor field;

FIG. 8 shows a storage example of identification information of a document structure, and field-designated document data in a correspondence table;

FIG. 9 shows another example of a structured document with a different document structure;

FIG. 13 shows an example of a difference document with the edit type="rewrite";

FIG. 14 shows an example of a difference document with the edit type="add";

FIG. 15 shows an example of a difference document with the edit type="delete";

FIG. 16 shows an example of a write request generated based on the difference document shown in FIG. 13;

FIG. 18 shows the rewritten state of the field-designated document data shown in FIG. 7, which is stored in the field-designated document data storage unit, upon execution of the write request shown in FIG. 16;

FIG. 20 shows another example of a write request;

FIGS. 21A and 21B show still other examples of write requests for two monitor fields;

FIG. 22 shows the rewritten state of the field-designated document data shown in FIG. 7, which is stored in the field-designated document data storage unit, upon execution of the write request shown in FIG. 20;

FIG. 23 shows field-designated document data of "member address book" information;

FIG. 24 shows an example of a difference document used to delete a browse-only, non-editable component;

FIG. 25 is a view for explaining the processing operation for changing a monitor field, and shows a state wherein attribute information "monitor$_{13}$ field="true"" is deleted from all components "member" designated in the field-designated document data shown in FIG. 7;

FIG. 26 is a view for explaining the processing operation for changing a monitor field, and shows a state wherein new monitor field designation data is registered in the correspondence table;

FIG. 27 is a view for explaining the processing operation for changing a monitor field, and shows field-designated document data in which a new monitor field is designated;

FIGS. 29A, 29B and 29C show an example of a relational database; and

FIG. 30 shows an example of field-designated document data with respect to the document data shown in FIG. 9.

DETAILED DESCRIPTION OF THE INVENTION

Embodiments of the present invention will be described hereinafter with reference to the accompanying drawings.

Figure 1:
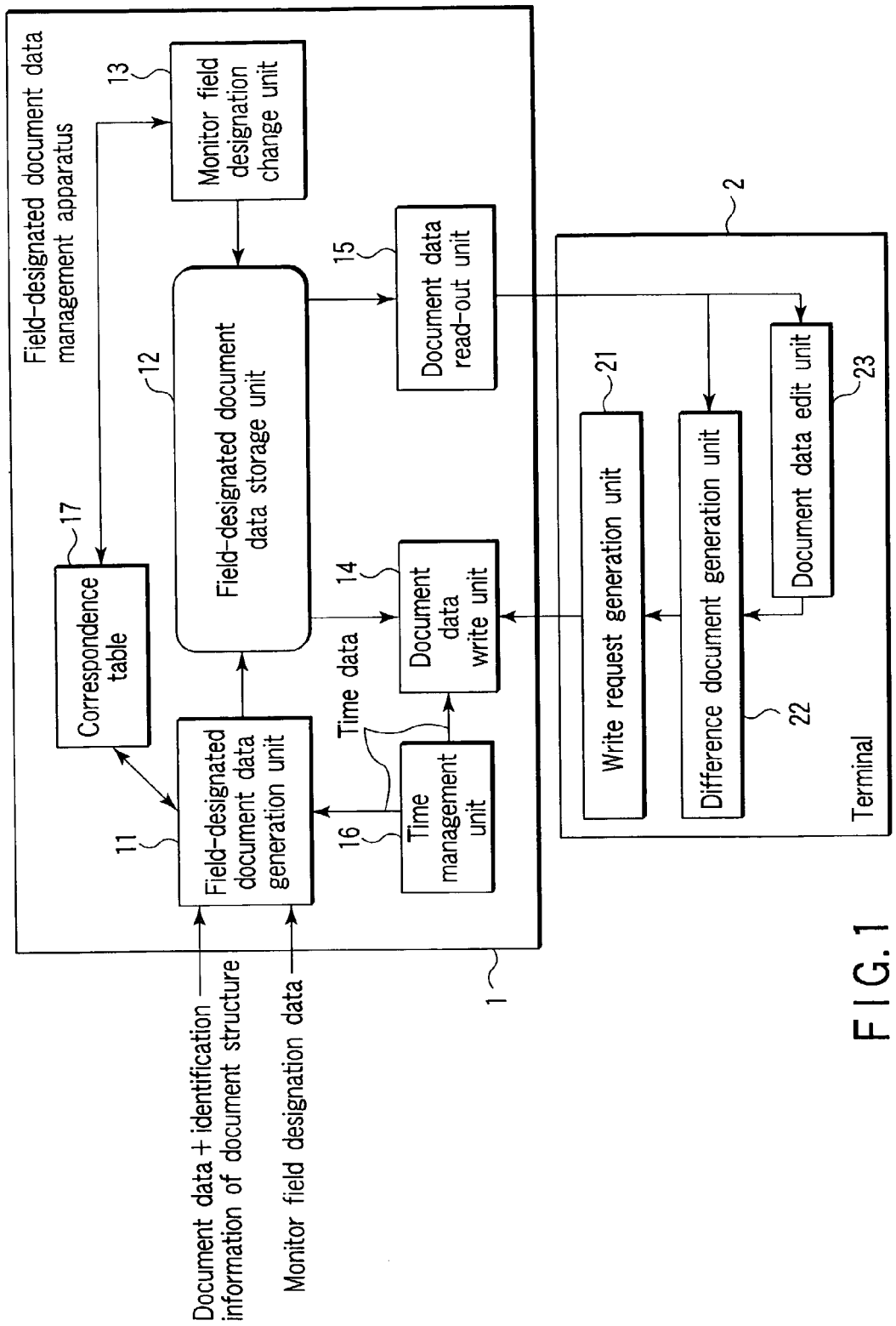
FIG. 1 is a schematic block diagram showing an example of the arrangement of a document data management system according to an embodiment of the present invention.

FIG. 1 schematically shows an example of the arrangement of a document data management system according to this embodiment. The document data management system roughly comprises a field-designated document data management apparatus (to be simply referred to as a document data management apparatus) 1 which serves as a server for storing and managing a plurality of document data, and a terminal 2 which serves as a client such as a PDA, portable phone, personal computer, or the like for, e.g., editing field-designated document data read out from the document data management apparatus 1.

Note that the document data management apparatus 1 corresponds to a structured document management apparatus, and the terminal 2 corresponds to a structured document edit apparatus.

The document data management apparatus 1 comprises a field-designated document data generation unit 11, field-designated document data storage unit 12, monitor field designation change unit 13, document data write unit 14, document data read-out unit 15, time management unit 16, and correspondence table storage unit 17.

The terminal 2 comprises at least a write request generation unit 21, difference document generation unit 22, and document data edit unit 23.

Document data to be processed by the document data management system shown in FIG. 1 is a structured document having an arbitrary document structure. The structured document includes those described in, e.g., SGML, XML, and the like. SGML (Standard Generalized Markup Language) is a standard specified by ISO (International Organization for Standardization). XML (extensible Markup Language) is a standard specified by W3C (World Wide Web Consortium). These are structured document rules that can structure documents.

The following explanation will be given taking a document described in XML as an example of a structured document. That is, a document data management system which is designed to process structured documents described in XML will be explained, but the gist of the present invention to be described below can be applied to structured documents described in description languages other than XML.

The field-designated document data generation unit 11 receives document data of a structured document, identification information used to identify the type of document structure of that document data, and monitor field designation data (to be described later), and then generates field-designated document data (to be described later) based on these data. When field-designated document data is generated by inputting monitor field designation data to document data, the monitor field designation data used in this case is registered in the correspondence table 17 in correspondence with the type of document structure of that document data. When document data with document structure, the monitor field designation data of which has already been registered in the correspondence table 17, is input to the field-designated document data generation unit 11 later, field-designated document data is generated using the monitor field designation data registered in the correspondence table 17.

That is, when there are a plurality of document structures, if monitor field designation data is input to only one document data corresponding to each document structure, field-designated document data can be generated without inputting monitor field designation data to other document data of the identical document structure (by designating only the identification information of the document structure).

The field-designated document data generated by the field-designated document data generation unit 11 is stored in the field-designated document data storage unit 12.

The document data management system shown in FIG. 1 is designed to process a plurality of structured is documents of different document structures. Therefore, these plurality of structured documents are categorized based on the types of document structures corresponding to the structured documents, and are then stored in the field-designated document data storage unit 12.

Figure 10:
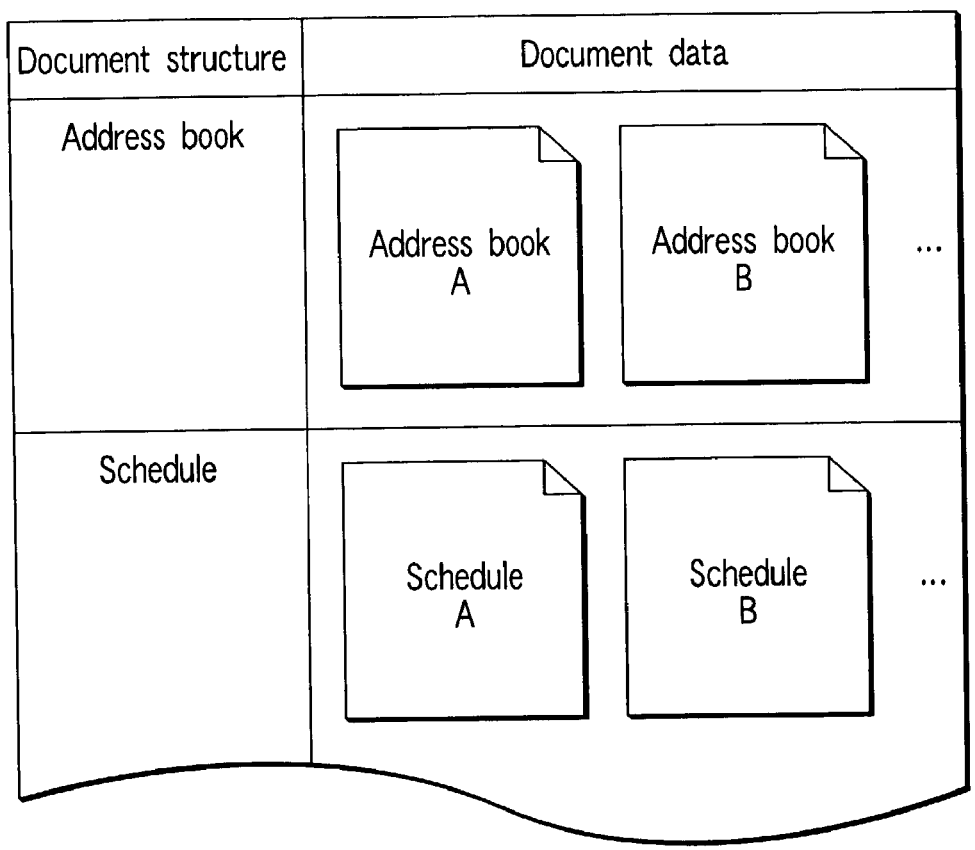
FIG. 10 illustrates a storage example of document data in the field-designated document data storage unit.

FIG. 10 depicts a storage example of document data in the field-designated document data storage unit 12. The storage unit 12 stores identification information (e.g., "address book", "schedule", and the like) of document structures, and files of document data corresponding to the identification information of respective document structures in the form of a table in association with each other.

The document data read-out unit 15 reads out field-designated document data from the field-designated document data storage unit 12 in accordance with a request from the terminal 2.

The monitor field designation change unit 13 is used to change designation of a monitor field for a document structure, in which the monitor field has already been designated, and field-designated document data, which has that document structure and has already been stored in the field-designated document data storage unit 12.

The time management unit 16 provides a last write time (to be described later) to the document data write unit 14 and field-designated document data generation unit 11.

The document data edit unit 23 in the terminal 2 is used to edit field-designated document data read out from the document data management apparatus 1.

The difference document generation unit 22 compares field-designated document data before and after the edit process for each monitor field to extract a difference, thus generating a difference document (to be described later).

The write request generation unit 21 generates a write request to the document data management apparatus 1 based on the generated difference document.

The document data write unit 14 in the document data management apparatus 1 receives a write request sent from the terminal 2, and writes in the field-designated document data storage unit 12 on the basis of this write request and time data provided by the time management unit 16.

Figure 2:
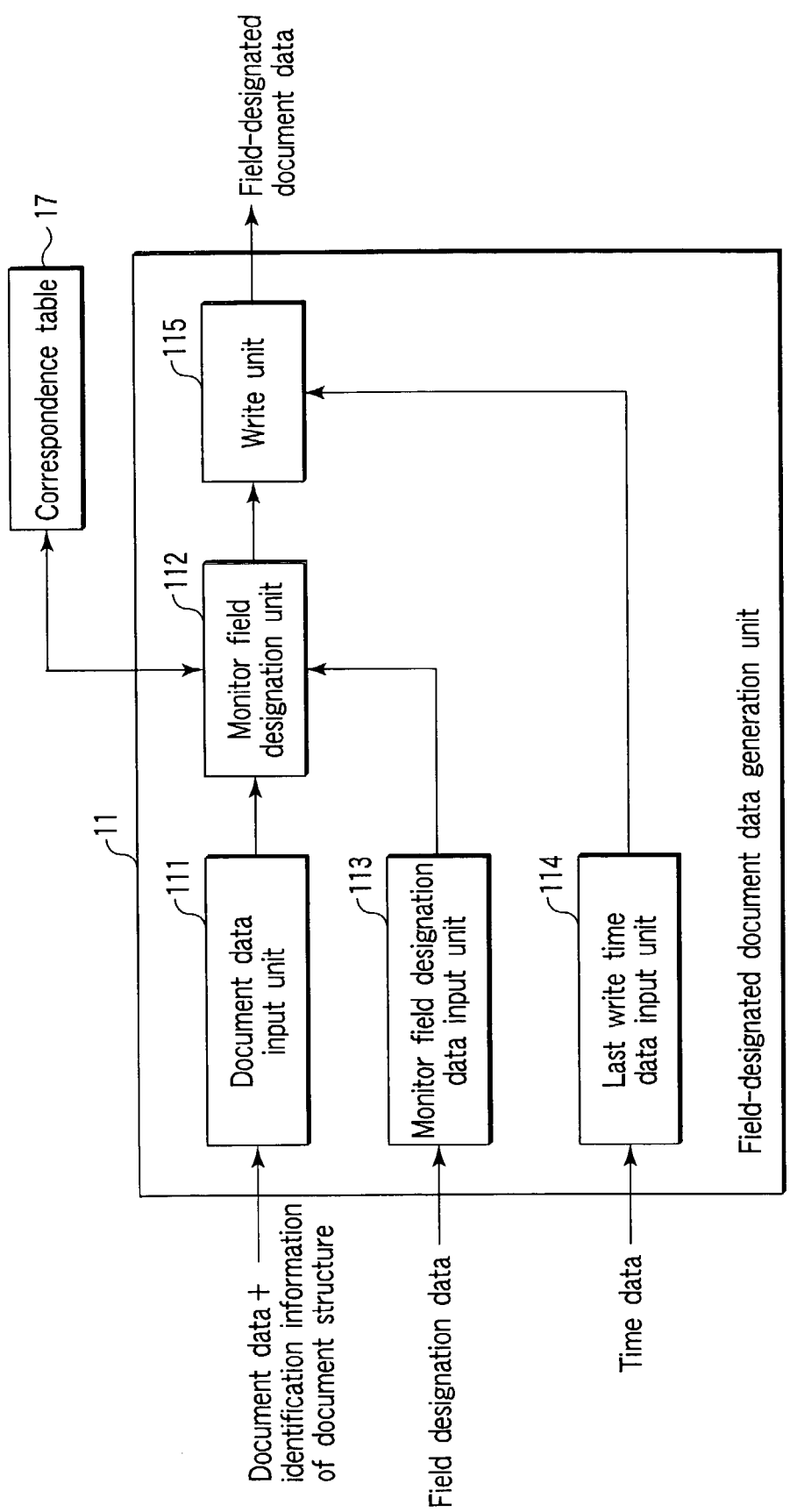
FIG. 2 is a schematic block diagram showing an example of the arrangement of a field-designated document data generation unit in a field-designated document data management apparatus.

FIG. 2 shows an example of the arrangement of the field-designated document data generation unit 11. The generation unit 11 comprises a document data input unit 111, monitor field designation unit 112, monitor field designation data input unit 113, last write time data input unit 114, and write unit 115. The arrangement and processing operation of the field-designated document data generation unit 11 will be described below with reference to FIG. 2 and the flow chart shown in FIG. 11.

Field-designated document data is generated from a structured document data having a document structure formed of a plurality of components such as XML, and field designation data for designating a monitor field consisting of at least one component.

The monitor field can be set for at least one component of one document structure. In this embodiment, the monitor field is set for each data range consisting of at least one of a plurality of components of a document structure. The monitor field corresponds to a range of data used to control write accesses from a plurality of users, as will be described later.

For example, assume that one structured document includes a component that describes a company name, and a component that describes a company telephone number, which are set in different monitor fields. In this case, assume that when write accesses from a plurality of users are made for that structured document and write control (to be described later) is done for respective monitor fields, rewrite of the component that describes the company name is permitted, and rewrite of the component that describes the company telephone number is denied. As a result, the contents of the two components might become inconsistent. A data range consisting of a plurality of components having a relationship in which rewrite of the value of at least one component cause inconsistency with the values of other non-rewritten components (such relationship will be referred to as dependency hereinafter) of a plurality of components of a document structure is set as a monitor field, and write accesses from a plurality of users (to be described later) are controlled for each monitor field, thus easily avoiding conflict that causes inconsistent contents.

Write control is done for respective monitor fields as follows. For example, when a plurality of users make write accesses to data of an identical version of an identical monitor field of an identical structured document, only a write request, which has arrived at the earliest time, of those from the plurality of users, is executed, and other write requests are denied.

More specifically, the time when the last write access corresponding to the version number of data of a given monitor field was made to that monitor field (last write time) is recorded for respective monitor fields. This recorded time is compared with the last write time written in the monitor field before rewrite used in the current write access, and if the former time is later than the latter one, the current write access is denied.

In this embodiment according to the present invention, the monitor field set for each document structure is variable of its range.

An XML document is a standard document format as a structured document. XML forms a structured document by arranging components called nodes in a tree structure.

For example, XML data (document data) that expresses "address book" information is as follows:

```
<address_book>
    <member>
        <name>Taro Yamada</name>
        <mail>yamada@taiyo-tusin.com</mail>
        <office>Taiyo Tusin</office>
    </member>
    <member>
        <name>Hanako Suzuki</name>
        <mail>hanako@kanagawa-gass.co.jp</mail>
        <office>Kanagawa Gas</office>
    </member>
</address_book>
```

This document data has a document structure in which a component (node) "address_book" has a plurality of child components "member", and each component "member" has child components "name", "mail", and "office". Each component is bounded by tags (<component name>) that represents the component name.

For example, assume that identification information of the aforementioned document structure of the above document data, i.e., "address book" information, is "address_book".

XML will be briefly explained below.

XML uses tags to express a document structure. The tags include start and end tags. By bounding each component of document structure information by start and end tags, a character string (text) delimiter in a document and a component to which that text belongs in terms of a structure can be clearly described.

Note that a start tag is defined by closing a component name (tag name) by "<" and ">", and an end tag is defined by closing a component name by "</" and ">". The contents of a component that follows a tag are text (character string) or repetition of a child component. Also, the start tag can be set with attribute information like "<component name attribute="attribute value">". A component which does not contain any text like "<mail></mail>" can also be simply expressed by "<mail/>".

In this embodiment, "address book/member" is used to designate the range of data consisting of a component group present below node "member" as one of child components of tag "address_book", and "address book/member/name" is used to designate the range of data consisting of a component group present below node "name" as a child component of "member". Such expressions ("address book/member", "address book/member/name") used to designate specific areas (data ranges) in the structured document will be referred to as paths.

A case will be examined below wherein monitor fields are set for, e.g., respective components "member" in the document data of the "address_book" information, i.e., for respective data ranges consisting of component groups present below component "member". For example, if the format of monitor field designation data is "monitor field= (path to monitor field)", monitor field designation data in this case is "monitor_field=address book/member".

The following explanation will be given while taking as an example a case wherein document data such as the "address_book" information described above is newly stored in the document data management apparatus 1.

Figure 11:
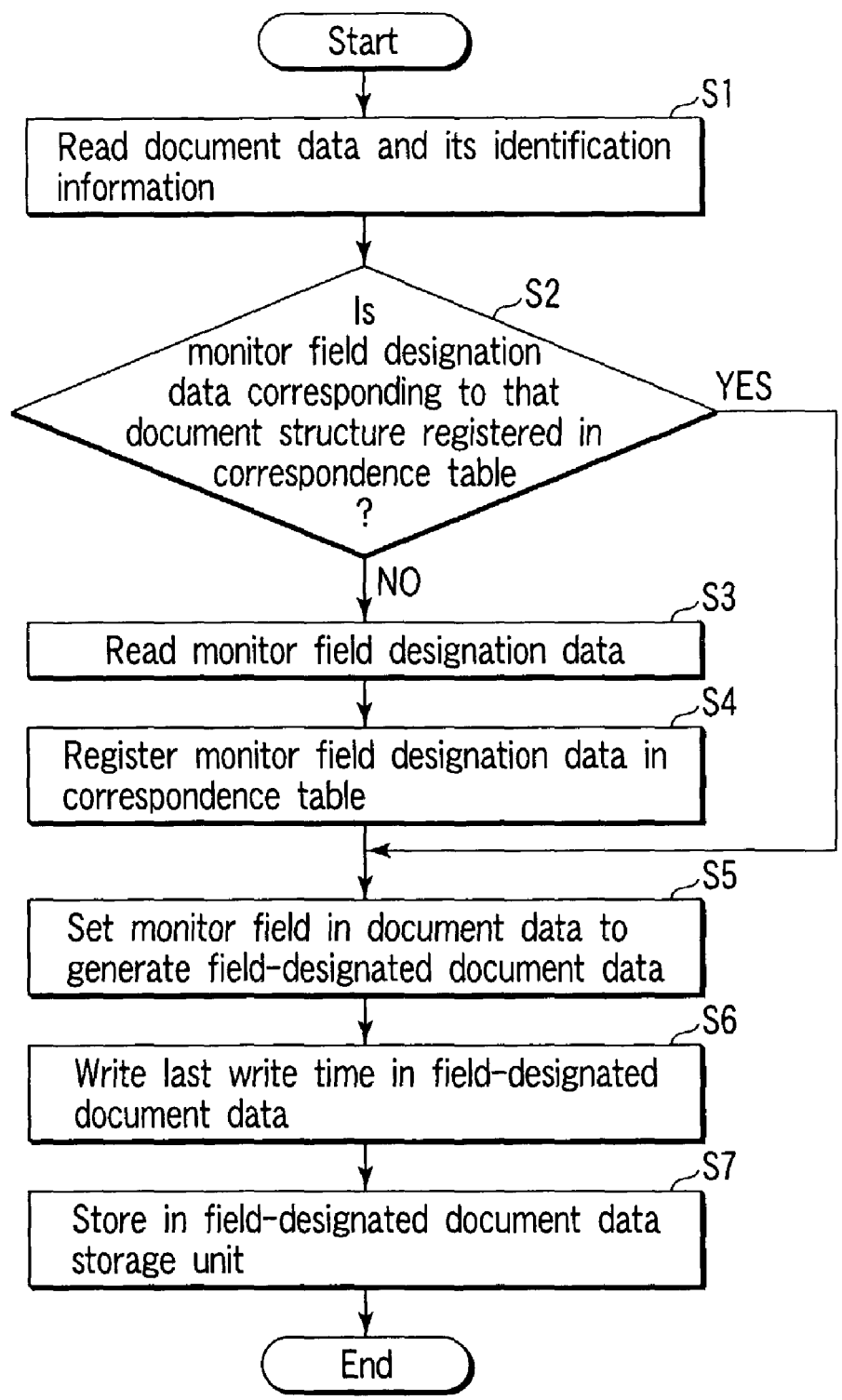
FIG. 11 is a flow chart for explaining the processing operation of the field-designated document data generation unit.

The document data input unit 11 receives document data like the "address book" information, and identification information (e.g., "address_book" in this case) of the document structure of that document data (step S1 in FIG. 11). The input document data and the identification information of the document structure of that document data are passed to the monitor field designation unit 112.

At this time, only when it is determined with reference to the correspondence table 17 that no monitor field designation data corresponding to the input identification information of the document structure is registered (step S2 in FIG. 11), the monitor field designation unit 112 displays a predetermined message to prompt the user to input monitor field designation data. In this case, the user can only input monitor field designation data, e.g., "monitor_field=address book/member" in the monitor field designation data input unit 113 (step S3 in FIG. 11). The monitor field designation data input to the monitor field designation data input unit 113 is passed to the monitor field designation unit 112.

The monitor field designation unit 112 registers the received monitor field designation data ("monitor_field=address book/member") in the correspondence table 17 in correspondence with the identification information (e.g., "address_book") of the document structure of the field-designated document data, as shown in FIG. 8 (step S4 in FIG. 11).

On the other hand, if it is determined in step S2 in FIG. 11 that the monitor field designation data corresponding to the input identification information of the document structure has already been registered in the correspondence table 17 (the user need not input new monitor field designation data), the monitor field designation data corresponding to the input identification information of the document structure is read out from the correspondence table 17. The control skips steps S3 and S4, and jumps to step S5.

In step S5 in FIG. 11, the monitor field designation unit 112 generates field-designated document data using the document data which is input from the document data input unit 11 and in which no monitor fields have not been set yet, and the monitor field designation data input from the monitor field designation data input unit 113 (or monitor field designation data read out from the correspondence table 17) (step S5 in FIG. 11).

Figures 5, 6:
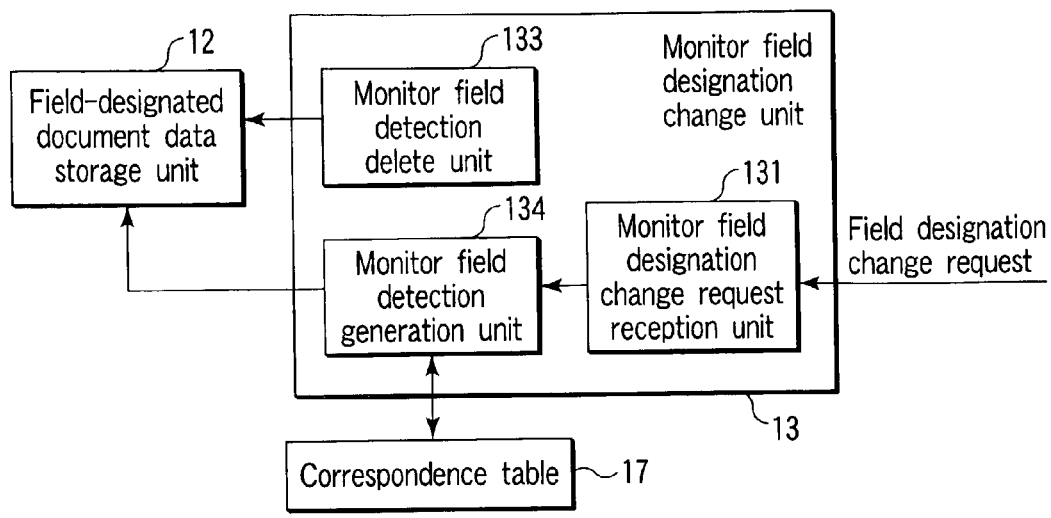
FIG. 5 is a block diagram showing an example of the arrangement of a monitor field designation change unit in the field-designated document data management apparatus.
FIG. 6 shows an example of field-designated document data.

For example, based on the monitor field designation data "monitor_field=address book/member" and the document data of the "address book" information, field-designated document data shown in FIG. 6 is generated.

As indicates by the second and seventh lines in FIG. 6, information which indicates a component designated as a monitor field by the monitor field designation data is added as attribute information of that component. More specifically, attribute information "monitor_field="true"" is set in the start tag of the component (component with component name "member") designated as the monitor field.

The last write time data input unit 114 inputs time data provided by the time management unit 16 as the last write time data. The write unit 115 records the last write time as a write time in the field-designated document data storage unit 12 in each monitor field of the generated field-designated document data (step S6 in FIG. 11).

For example, in case of the field-designated document data shown in FIG. 6, a monitor field is designated for each component "member". Also, assume that time data received as last write time data upon storing the field-designated document data shown in FIG. 6 in the field-designated document data storage unit 12 is, for example, "2001/3/3 10:23". At this time, the write unit 115 further sets "last_write_time="2001/3/3 10:23"" as attribute information to the start tag of each component designated as a monitor field in the field-designated document data shown in FIG. 6, as indicated, e.g., by the second and sixth lines in FIG. 7.

The write unit 115 finally stores a file of the field-designated document data (e.g., file name "address book A") shown in FIG. 7, in which attribute information indicating a monitor field and attribute information indicating the last write time are set for each component set as a monitor field, in the field-designated document data storage unit 12 in FIG. 1, as shown in FIG. 10 (step S7 in FIG. 11).

In the above description, one document data file of one document structure has been exemplified. However, in practice, a plurality of document data with different document structures are present, and monitor fields are set for those document structures, as described above (field-designated document data is generated and is registered in the correspondence table 17).

When the monitor fields are set for arbitrary one document data of arbitrary one document structure, the identification information of that document structure and corresponding monitor region designation data are registered in the correspondence table 17, as shown in FIG. 8. After that, monitor fields can be set (designated) in identical components in other document data with the same document structure.

For example, assume that a structured document shown in FIG. 9 is present as document data of a document structure different from that of the document data of the "address book" information.

The structured document shown in FIG. 9 is document data of "schedule" information having a document structure in which component (node) "schedule" includes a plurality of child components "Item", and each component "Item" has child components "Date", "Time", "Subject", "Place", and "Body".

For example, assume that identification information of the aforementioned document structure of the document data of "schedule" information shown in FIG. 9 is "schedule".

A case will be examined below wherein monitor fields are set for, e.g., respective components "Item" in the document structure of the document data shown in FIG. 9, as in the case of the document data of the "address book" information (see FIG. 30). In this case, monitor field designation data is "monitor field=schedule/Item".

When the structured document in FIG. 30 is newly stored in the document data management apparatus 1 according to FIG. 11, the identification information "schedule" of the document structure, and the monitor field designation data "monitor field=schedule/Item" are registered in the correspondence table 17, as shown in FIG. 8. Also, a file of the document data shown in FIG. 9 (e.g., file name "schedule A") is stored in the field-designated document data storage unit 12, as shown in FIG. 10.

Figure 28:
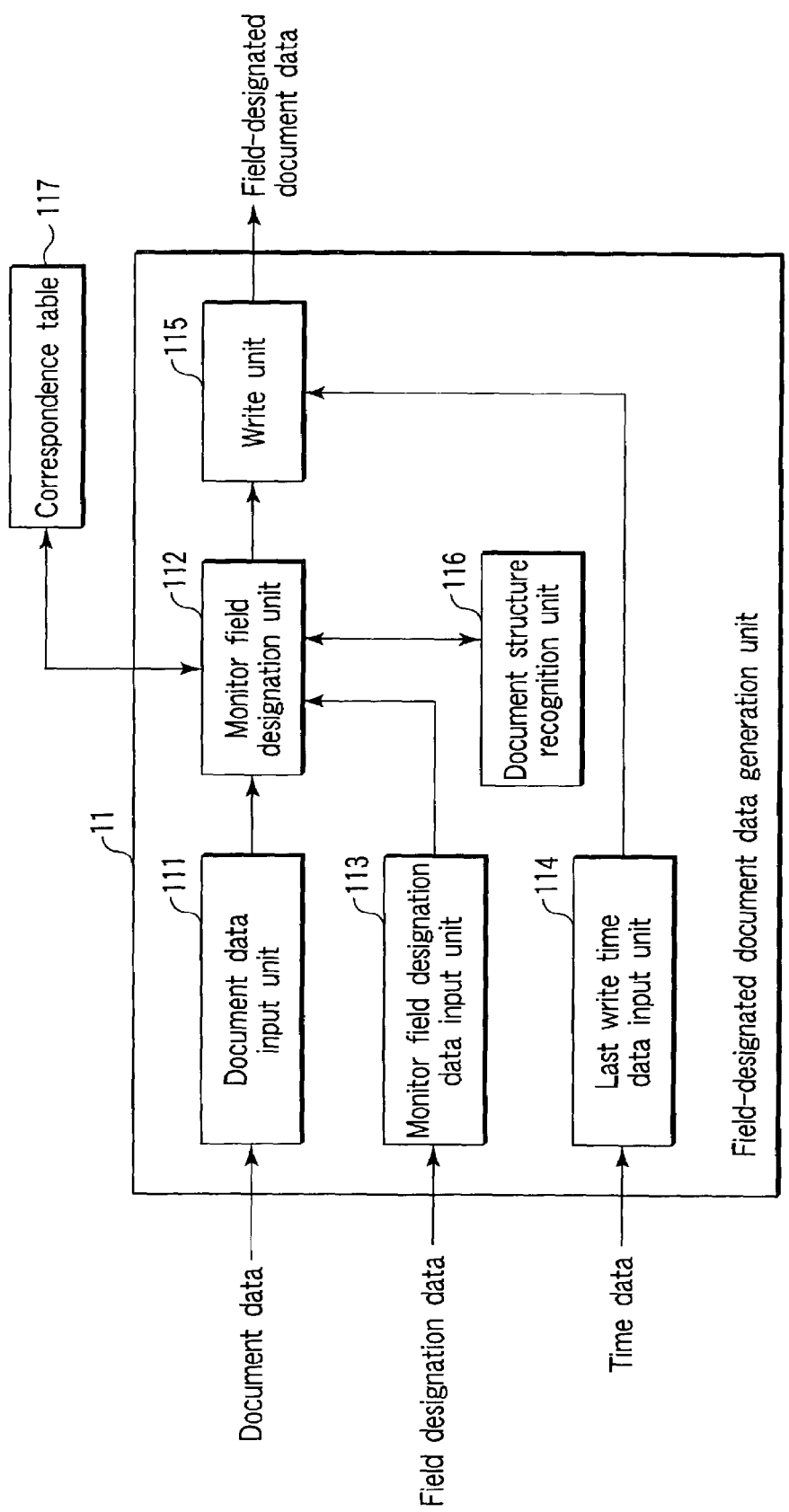
FIG. 28 is a block diagram showing another example of the arrangement of the field-designated document generation unit.

FIG. 28 shows another example of the arrangement of the field-designated document data generation unit 11, which is substantially the same as that in FIG. 2, except that a document structure recognition unit 116 is connected to the monitor region designation unit 112.

The document structure recognition unit 116 has a parser, which recognizes the document structure of input document data. The document structure recognition unit 116 pre-stores a DTD (Document Type Definition) for each of different document structures. Each DTD is stored in correspondence with the identification information of that document structure.

When new document data is input from the document data input unit 111, the parser in the document structure recognition unit 116 obtains identification information of a DTD, which matches the document structure of the input document data, using the pre-stored DTDs one by one, so as to determine a document structure corresponding to the input document data. Hence, if this document structure recognition unit 116 is arranged, no identification information of the document structure need be input.

The subsequent processing operation is the same as that in FIG. 11.

The terminal 2 will be explained below.

Field-designated document data shown in FIG. 2, which is read out from the field-designated document data storage unit 12 by the document data read-out unit 15 in response to a request from the terminal 2, is browsed and edited by the document data edit unit 23.

The difference document generation unit 22 compares field-designated document data before and after the edit process for each monitor field to extract their difference, thus generating a difference document (to be described later).

Figure 3:
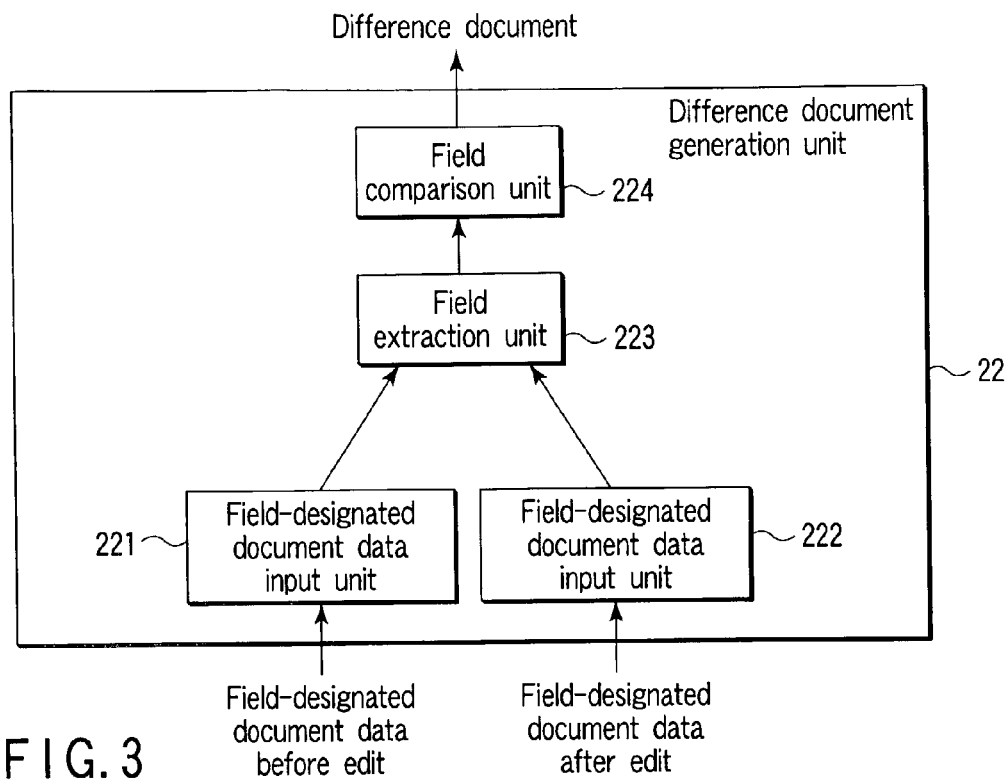
FIG. 3 is a block diagram showing an example of the arrangement of a difference document generation unit in a terminal.

FIG. 3 shows an example of the arrangement of the difference document generation unit 22. The generation unit 22 comprises field-designated document data input units 221 and 222, field extraction unit 223, and field comparison unit 224.

The field-designated document data input unit 221 receives field-designated document data before edit, and the field-designated document data input unit 222 receives field-designated document data that has been edited by the document data edit unit 23.

The field extraction unit 223 extracts corresponding monitor fields from the field-designated document data before and after the edit process.

The field comparison unit 224 compares two corresponding monitor fields extracted from the field-designated document data before and after the edit process to generate a difference, i.e., a difference document (to be described later).

The write request generation unit 21 receives the difference document, extracts a field indicated by the difference document (to be described later) and write contents, and generates a write request containing them.

The description will revert to that of the document data management apparatus 1.

Figure 4:
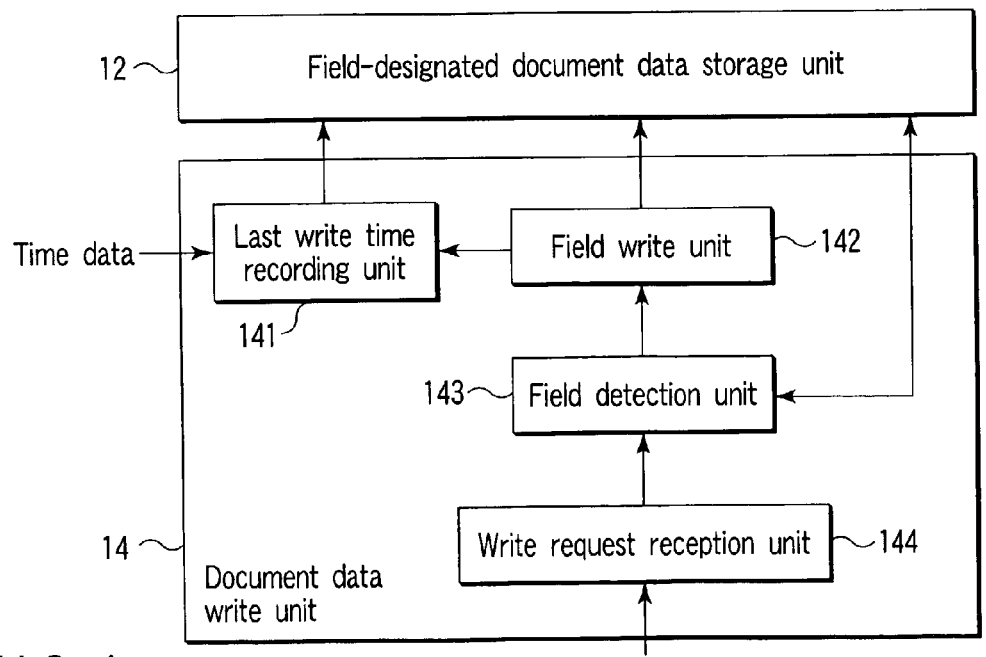
FIG. 4 is a block diagram showing an example of the arrangement of a document data write unit in the field-designated document data management apparatus.

FIG. 4 shows an example of the arrangement of the document data write unit 14 in the document data management apparatus 1. The write unit 14 comprises a last write time recording unit 141, field write unit 142, field detection unit 143, and write request reception unit 144.

The write request reception unit 144 receives a write request sent from the terminal 2. The request includes information (write objective field information) indicating a write objective monitor field in field-designated document data, and information (write content information) indicating the contents to be written in practice.

The field detection unit 143 detects a write objective field from the field-designated document data stored in the field-designated document data storage unit 12 on the basis of the write objective field information.

The field write unit 142 writes based on write content information contained in the received write request in the write objective field (write objective monitor field) detected from the field-designated document data.

The last write time recording unit 141 records a write time as an attribute value of attribute information "last write time" in the monitor field that has undergone the write access of the field write unit 142.

FIG. 5 shows an example of the arrangement of the monitor field designation change unit 13. The change unit 13 comprises a monitor field designation change request reception unit 131, monitor field designation delete unit 133, and monitor field designation generation unit 134.

The monitor field designation change request reception unit 131 receives a monitor field designation change request from the user.

The monitor field designation delete unit 133 deletes the current monitor field designation in field-designated document data with a designated document structure stored in the field-designated document data storage unit 12 on the basis of information, which is contained in the monitor region designation change request and designates a document structure and components as the old and new monitor fields.

The monitor field designation generation unit 134 generates monitor field designation data on the basis of information, which is contained in the monitor region designation change request and designates a document structure and components as the old and new monitor fields, and rewrites monitor field designation data corresponding to the identification information of the document structure in the correspondence table 17 by the generated monitor field generation data. Then, the unit 134 writes attribute information "monitor_field="true"" in the start tag of a component designated as a new monitor field in field-designated document data of the designated document structure stored in the field-designated document data storage unit 12, thereby setting that component as the monitor field.

A case will be explained below wherein the user establishes connection between the terminal 2 and document data management apparatus 1, and browses and edits field-designated document data stored in the document data management apparatus 1 at the terminal 2.

Upon receiving a read-out request from the terminal 2, the document data read-out unit 15 of the document data management apparatus 1 reads out field-designated document data corresponding to identification information (file name in this case) of field-designated document data contained in the request from the field-designated document data storage unit 12, and outputs the readout data to the terminal 2.

In the terminal 2, the field-designated document data is input to the difference document generation unit 22 as that before edit, and also to the document data edit unit 23.

After that, the user can browse and edit the field-designated document data using the document data edit unit 23.

In general, the edit process includes rewrite, delete, new addition and generation, and the like of some of the field-designated document data.

The difference document generation unit 22 compares the field-designated document data obtained as a result of such edit process, and the field-designated document data before edit for respective monitor fields, and generates a difference document indicating the type and location of edit.

Assume that there are three types of edit, e.g., "add", "rewrite", and "delete".

Assume that the user has rewritten "Hanako Suzuki" in the eighth line of the field-designated document data shown in FIG. 7 to "Hanako Ogawa" using the document data edit unit 23. As a result, a difference document generated by the difference document generation unit 22 is as shown in FIG. 13.

In the difference document shown in FIG. 13, the first and second lines describe the type of edit "rewrite", the third to eighth lines describe data of the monitor field of interest before edit as an objective field, and the ninth to 14th lines describe data of the monitor field of interest after edit to indicate the rewrite result. More specifically, as can be understood from the difference document shown in FIG. 13, "Hanako Suzuki" before edit (fifth line) is rewritten to "Hanako Ogawa" after edit (11th line).

On the other hand, assume that the user has written data that adds the following component "member" for one person between the 11th and 12th lines at the end of the field-designated document data in FIG. 7 in the edit process. It is preferable to add data at the end of the document.

```
"<member monitor_field="true" last_write_time=2001/4/4/
10:23>
    <name>Hajime Tanaka</name>
    <mail>tanaka@kanto-system.com</mail>
    <office>Kanto System</office>
</member>"
```

As a result, a difference document generated by the difference document generation unit 22 is as shown in FIG. 14.

In the difference document in FIG. 14, the first and second lines describe the type of edit "add", and the third to eighth lines describe data of one added monitor field to indicate the added data.

Assume that the user has deleted component "member" for one person in the seventh to 11th lines in the field-designated document data shown in FIG. 7 using the document data edit unit 23 in the edit process. As a result, a difference document generated by the difference document generation unit 22 is as shown in FIG. 15.

In the difference document shown in FIG. 15, the first and second lines describe the type of edit "delete", and the third to eighth lines describe data of the monitor field of interest deleted by edit as an objective field.

The processing operation of the difference document generation unit 22 in FIG. 3 will be described below with reference to the flow chart shown in FIG. 12.

Assume that the user has rewritten "Hanako Suzuki" in the eighth line of the field-designated document data shown in FIG. 7 to "Hanako Ogawa" using the document data edit unit 23 in the edit process.

Figure 12:
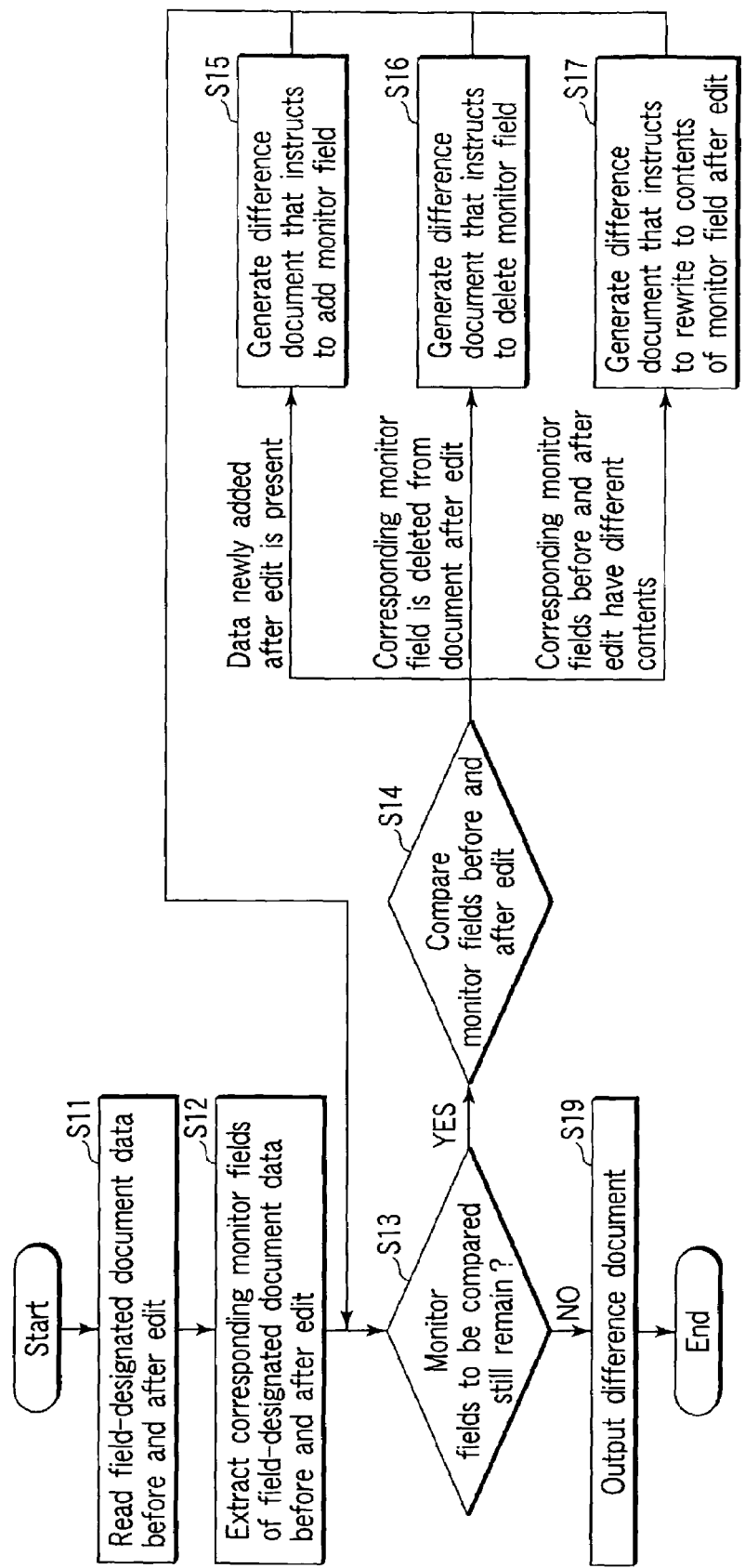
FIG. 12 is a flow chart for explaining the processing operation of the difference document generation unit shown in FIG. 3.

The field-designated document data input unit 221 of the difference document generation unit 22 receives the field-designated document data before edit shown in FIG. 7, and the field-designated document data input unit 222 receives field-designated document data after edit (step S11 in FIG. 12).

The field extraction unit 223 loads the input field-designated document data before and after edit, and extracts corresponding monitor fields (e.g., in the order of appearance) one by one from these two field-designated document data (step S12 in FIG. 12).

If a pair of corresponding monitor fields are extracted from the field-designated document data before and after edit, they are compared (step S14 in FIG. 12).

Upon comparison between data of the two corresponding monitor fields, if some data in the monitor field of interest in the field-designated document data after edit are different from those in the monitor field of interest in the field-designated document data before edit, it is determined that the type of edit is "rewrite", and the flow advances to step S17.

If the field-designated document data after edit does not have any monitor field corresponding to the monitor field of interest in the field-designated document data before edit, it is determined that the type of edit is "delete", and the flow advances to step S16.

On the other hand, if the field-designated document data before edit does not have any monitor field corresponding to the monitor field of interest in the field-designated document data after edit, it is determined that the type of edit is "add", and the flow advances to step S15.

In step S15, a difference document which has the type of edit "add", as shown in FIG. 14, is generated.

In step S16, a difference document which has the type of edit "delete", as shown in FIG. 15, is generated.

In step S17, a difference document which has the type of edit "add", as shown in FIG. 13, is generated.

Note that attribute information which permits only browse but denies any edit processes such rewrite, delete, and the like can be set in a component of document data to be processed by the document data processing system shown in FIG. 1. For example, when an attribute that allows only browse is to be set for data of component "name" in the third line in FIG. 7, attribute information "browse-only="true"" is written in the start tag of component "name" as follows:

"<name browse-only="true">Taro Yamada</name>"

If data of the monitor field extracted as a field to be compared in the field-designated document data after edit in step S17 in FIG. 12 contains a component with the above attribute information "browse-only="true"", that component is deleted from the monitor field to obtain data of the monitor field extracted as a field to be compared in the field-designated document data after edit.

After comparison is made for all monitor fields in the field-designated document data before and after edit (step S13), all generated difference documents are output to the write request generation unit 21, thus ending the processing (step S19).

Note that the difference document may contain, e.g., a file name as identification information of the field-designated document data to be processed.

The write request generation unit 21 of the terminal 2 generates a write request on the basis of the input difference documents. The write request contains, e.g., a file name as the identification information of field-designated document data, information (write object field information) indicating a write objective field in the field-designated document data, and information (write content information) indicating the contents to be actually written.

If the type of edit described in the difference document is "add", a write request in which write objective field information is "empty" and write content information is data described in a column "change contents" in the difference document is generated.

If the type of edit described in the difference document is "delete", a write request in which write objective field information indicates a monitor field described in a column "objective field" in the difference document, and write content information is "empty" is generated.

If the type of edit described in the difference document is "rewrite", a write request in which write objective field information indicates a monitor field described in a column "objective field" in the difference document, and write content information indicates data described in a column "change contents" in the difference document is generated. For example, a write request shown in FIG. 16 is generated on the basis of the difference document shown in FIG. 13.

The write request shown in, e.g., FIG. 16, which is generated by the write request generation unit 21 of the terminal 2 is sent to the document data management apparatus 1.

The document data write unit 14 of the document data management apparatus 1 starts operation upon reception of the write request shown in, e.g., FIG. 16.

The processing operation of the document data write unit 14 in FIG. 4 will be described below with reference to the flow chart shown in FIG. 17.

The write request shown in FIG. 16 is received by the write request reception unit 144 of the document data write unit 14 (step S21).

Write objective field information and write content information are extracted from the received write request (step S22).

If it is determined in step S23 that the write objective field information is empty (that is, in case of a write request which includes the type of edit="add" and writes to add a monitor field), the flow advances to step S24, and the field write unit 142 generates a new monitor field in designated field-designated document data stored in the field-designated document data storage unit 12 using the write content information contained in the write request (step S24). The last write time recording unit 141 records the last write time as attribute information in the start tag of the newly written monitor field (step S30).

Figure 17:
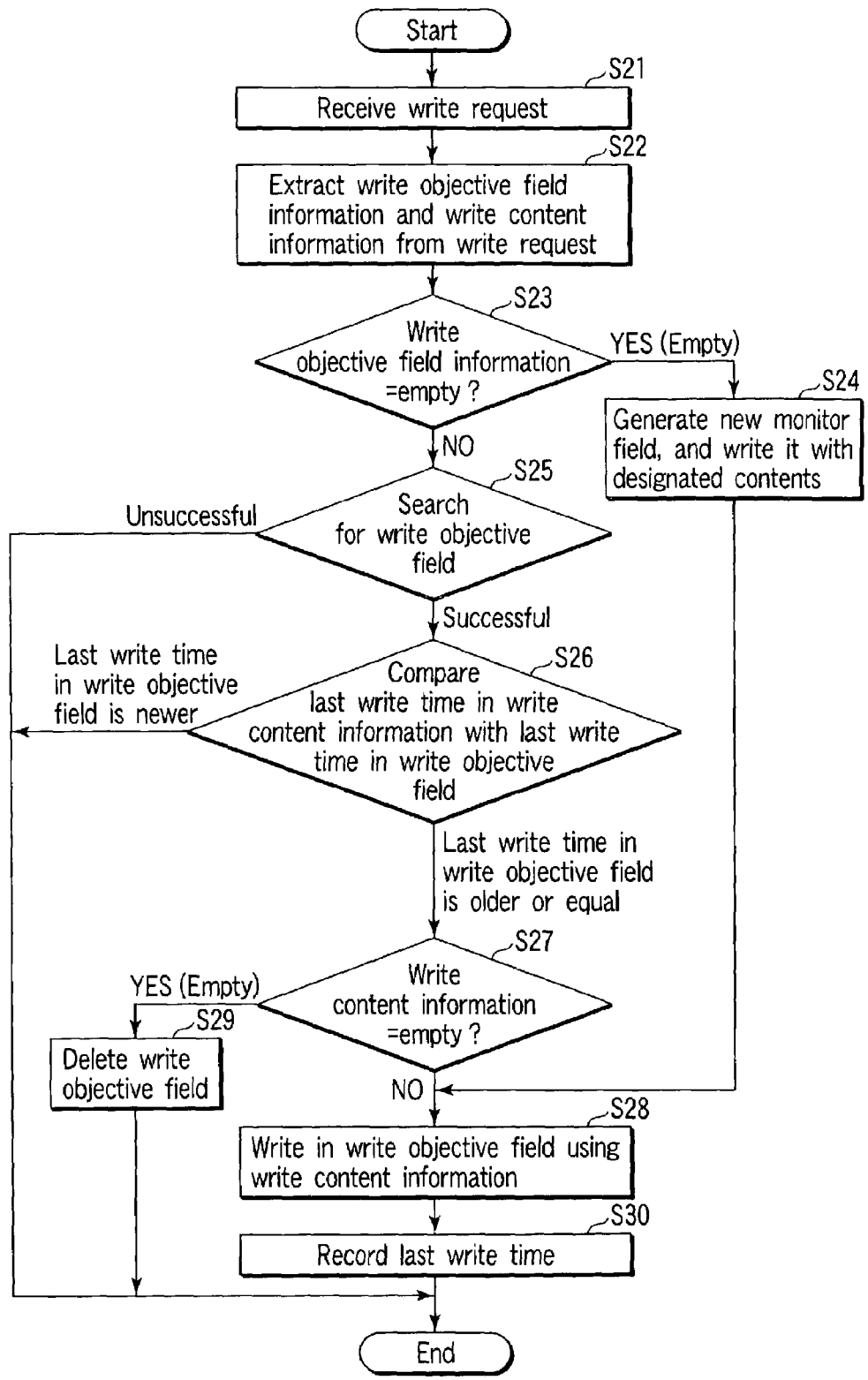
FIG. 17 is a flow chart for explaining the processing operation of the document data write unit shown in FIG. 4.

If it is determined in step S23 in FIG. 17 that the write objective field information is not empty, the flow advances to step S25.

In step S25, the field-designated document data detection unit 143 detects a monitor field designated by the write objective field information from the designated field-designated document data stored in the field-designated document data storage unit 12. In this case, the designated monitor field can be simply detected by matching between the value of each component in the write objective field information, and that of each component in each monitor field in the designated field-designated document data stored in the field-designated document data storage unit 12.

If detection of the designated monitor field from the designated field-designated document data stored in the field-designated document data storage unit 12 has succeeded, the flow advances to step S26; otherwise, the processing ends.

In step S26, the field write unit 142 checks conflict by comparing the last write time as attribute information of the monitor field in the write content information and that of the monitor field as the detected write objective field.

If the last write time of the write objective field is newer than that of the monitor field in the write content information, since another user has made write access to the same monitor field in the same field-designated document data after that field-designated document data was read out from the field-designated document data storage unit 12 for the current edit process, the presence of conflict can be determined. Hence, the current write request is denied, and the processing ends.

On the other hand, if the last write time of the write objective field is older than or equal to that of the monitor field in the write content information, since no conflict occurs even when the current write request is permitted, the flow advances to step S27 to proceed with the processing.

If it is determined in step S27 that the write content information is empty (that is, in case of a write request which has the type of edit "delete" and deletes a monitor field), the flow advances to step S29; otherwise (that is, in case of a write request which has the type of edit "rewrite", and rewrites some data in a monitor field), the flow advances to step S28.

In step S28, the field write unit 142 writes in the write objective field, detected in step S25, of the designated field-designated document data stored in the field-designated document data storage unit 12 using the write content information contained in the write request. The last write time recording unit 141 rewrites the value of the last write time as attribute information of the start time of the rewritten monitor field using time data provided from the time management unit 16 at that time (step S30).

For example, when "Hanako Suzuki" in the field-designated document data shown in, e.g., FIG. 7 is rewritten to "Hanako Ogawa" at the terminal 2, the difference document shown in FIG. 13 is generated, and the write request shown in FIG. 16 is also generated. When the document data write unit 14 receives this write request, the field-designated document data, which is stored in the field-designated document data storage unit 12 and shown in FIG. 7, is rewritten, as shown in FIG. 18, via the aforementioned processes. In this case, the value of component "name" in the eighth line in FIG. 18 has been rewritten to "Hanako Ogawa". Since such write access was made at time "2001/3/3 12:31", last_write_time="2001/3/3 12:31" is written as attribute information in component "member" in the seventh line in FIG. 18.

In step S29, the field write unit 142 deletes the write objective field, detected in step S25, of the designated field-designated document data stored in the field-designated document data storage unit 12.

Figure 19:
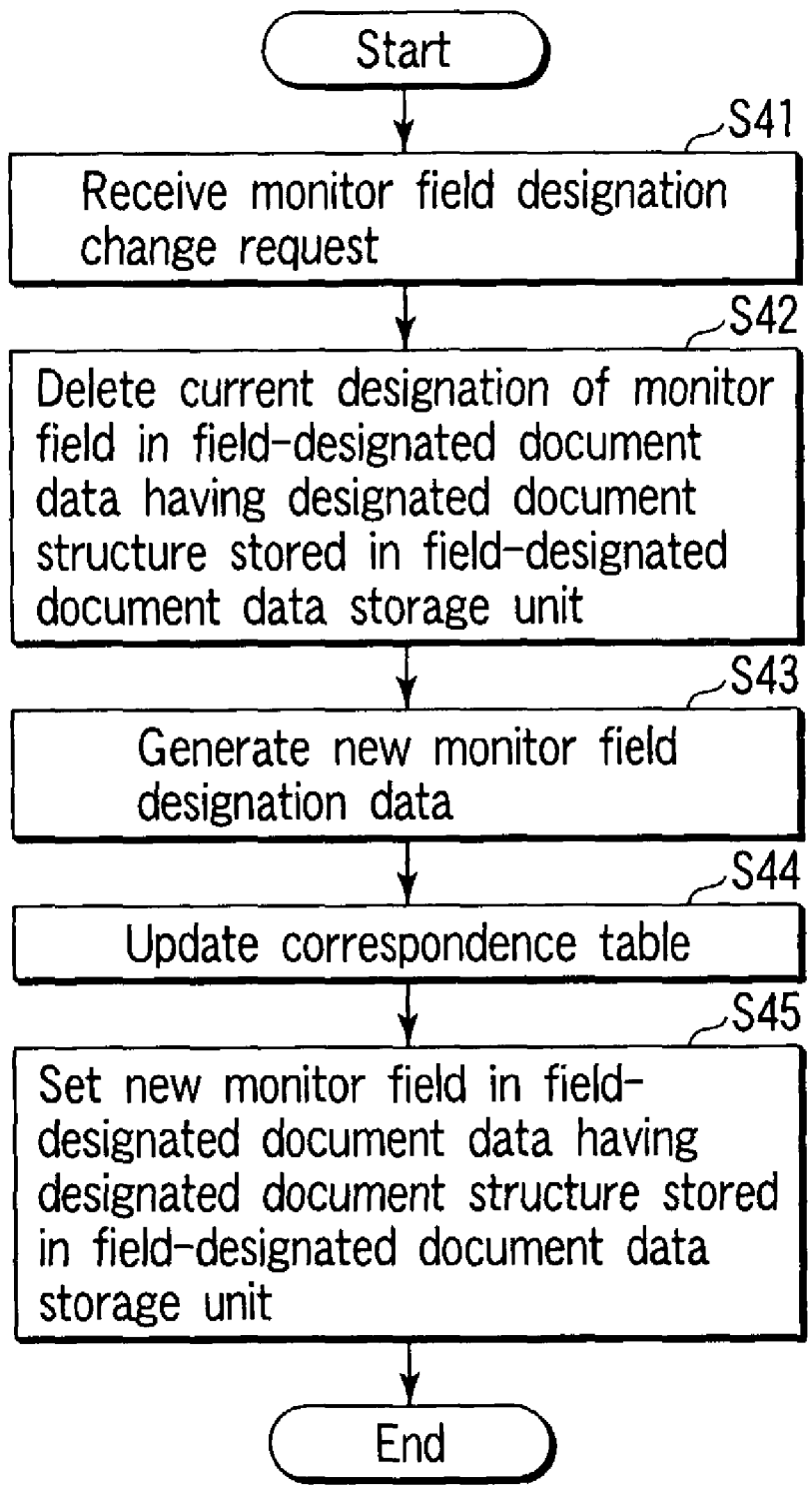
FIG. 19 is a flow chart for explaining the processing operation of a monitor field change unit of the field-designated document data management apparatus.

Finally, the processing operation of the monitor field change unit 13 for changing monitor fields set for respective document structures will be described below with reference to the flow chart shown in FIG. 19. A case will be exemplified below wherein the current monitor field set in component "member" in the document structure of the field-designated document data shown in FIG. 7 is re-set in components "name", "mail", and "office".

The monitor field designation change request reception unit 131 receives a monitor field designation change request from the user (step S41). This monitor field designation change request contains identification information of the document structure (in this case, "address_book"), and information indicating old and new components to be set as monitor fields (in this case, information that designates a change from "address book/member" to "address book/member/name", "address book/member/mail", and "address book/member/office").

The monitor field designation delete unit 132 deletes the current monitor field designation in all field-designated document data which are stored in the field-designated document data storage unit 12 and have the designated document structure, on the basis of the identification information of the document structure contained in the monitor field designation change request. That is, the unit 132 deletes attribute information "monitor_field="true"" that designates a monitor field (step S42).

For example, in case of the field-designated document data shown in FIG. 7, all pieces of attribute information "monitor_field="true"" are deleted from components "member", as shown in FIG. 25.

The monitor field designation generation unit 134 generates monitor region designation data on the basis of the information which is contained in the monitor field designation change request, and designates old and new components to be set as monitor fields (step S43), and rewrites the monitor field designation data corresponding to the identification information of the document structure in the correspondence table 17 by the generated monitor field designation data (step S44). The unit 134 then writes attribute information "monitor_field="true"" in start tags of components designated as new monitor fields in field-designated document data with the designated document structure, which are stored in the field-designated document data storage unit 12, thereby setting these components as monitor fields (step S45).

For example, monitor field designation data "monitor$_{13}$field=address book/member/name", "monitor$_{13}$field=address book/member/mail", and "monitor$_{13}$field=address book/member/office" are generated in this case. In a column of identification information "address book" of the document structure in the correspondence table 17, the above three monitor field designation data are registered, as shown in FIG. 26. Also, attribute information "monitor_field="true"" is written in tags "name", "mail", and "office" of each document data from which attribute information "monitor_field="true"" has been deleted, as shown in FIG. 25, and which has the designated document structure, using the aforementioned three monitor field designation data, as shown in FIG. 27.

In this embodiment, the user's monitor field designation change request contains the identification information of a document structure (e.g., "address book"), and information indicating old and new components to be set as monitor fields (in this case, information that designates a change from "address book/member" to "address book/member/name", "address book/member/mail", and "address book/member/office"), and the monitor field designation generation unit 134 generates monitor field designation data (e.g., "monitor_field=address book/member/name", "monitor_field=address book/member/mail", and "monitor_field=address book/member/office") on the basis of the information which is contained in the monitor field designation change request and designates old and new components to be set as monitor fields. However, the present invention is not limited to such specific process. For example, the user's monitor field designation change request may contain the identification information of the document structure and new monitor field designation data themselves (e.g., "monitor_field=address book/member/name", "monitor_field=address book/member/mail", and "monitor_field=address book/member/office" in the above case). In such case, the monitor field designation generation unit 134 need not generate any monitor field designation data, and need only register the received new monitor field designation data in the correspondence table 17, and re-set new monitor fields in field-designated document data, from which attribute information "monitor_field="true"" has been deleted, on the basis of the received new monitor field designation data.

(Detailed Description of Process of Document Write Unit Upon Receiving a Plurality of Write Requests)

For example, assume that two users A and B have read out identical field-designated document data shown in FIG. 7, and edited the readout data using their terminals 2.

Assume that user A has rewritten "Taiyo Tusin" in the fifth line in FIG. 7 to "Taiyo Tusin K.K." in the edit process. FIG. 20 shows a write request generated in this case.

On the other hand, assume that user B has rewritten "yamada@taiyo-tusin.com" in the fourth line in FIG. 7 to "yamada@taiyo-communicate.com", rewritten "hanako@kanagawa-gass.co.jp" in the ninth line to "hanako@yokohama-gass.co.jp", and rewritten "Kanagawa Gas" in the 10th line to "Yokohama Gas" in the edit process. That is, user B has made an edit process across two monitor fields. In this case, a total of two write requests are generated in correspondence with monitor fields as write objective fields, as shown in FIGS. 21A and 21B.

Assume that the write request for reflecting the edit result in the field-designated document data storage unit 12 has arrived from user A at "2001/3/3 11:10", and the write requests for reflecting the edit result in the field-designated document data storage unit 12 have arrived from user B at "2001/3/3 12:10". That is, the write request from user A has arrived earlier than that from user B.

The last write time as attribute information of a monitor field in the write content information, which is contained in the write request from user A, is "2001/3/3 10:23", as indicated by the eighth line in FIG. 20. On the other hand, the last write time as attribute information of a monitor field, which is detected as the write objective field in step S25 in FIG. 17 and is designated by the write objective field information in the designated field-designated document data stored in the field-designated document data storage unit 12, is "2001/3/3 10:23", as indicated by the second line in FIG. 7. Hence, these two times are equal to each other. Therefore, the write request (FIG. 20) from user A is executed, and the field-designated document data which is stored in the field-designated document data storage unit 12 and shown in FIG. 7 is rewritten, as shown in FIG. 22. In FIG. 22, the value of the last write time as attribute information of the rewritten monitor field is rewritten to "2001/3/3 11:10".

The write requests from user B arrive while the field-designated document data shown in FIG. 22 is stored in the field-designated document data storage unit 12. The two write requests come from user B, and the last write times as attribute information of monitor fields in the write content information contained in the two requests are equal to each other, i.e., "2001/3/3 10:23", as indicated by the eighth lines in FIGS. 21A and 21B.

The write request in FIG. 21A is a rewrite request for a monitor field from the second to sixth lines in FIG. 22 (i.e., the monitor field from the second to sixth lines in FIG. 22 is a write objective field), and the write request in FIG. 21B is a rewrite request for a monitor field from the seventh to 11th lines in FIG. 22 (i.e., the monitor field from the seventh to 11th lines in FIG. 22 is a write objective field).

The last write time as attribute information of the monitor field in the write content information, which is contained in the write request in FIG. 21A, is "2001/3/3 10:23", as indicated by the eighth line in FIG. 20. On the other hand, the last write time as attribute information of the write objective field detected in step S25 in FIG. 17 is "2001/3/3 11:10", as indicated by the second line in FIG. 22. Hence, conflict can be determined in step S26 in FIG. 17, and the write request in FIG. 21A is denied.

On the other hand, the write request in FIG. 21B is executed.

In the above example, users A and B have issued data write requests associated with "Taro Yamada" for component "office" (user A), and component "mail" (user B). Since these two users have issued write requests for different components, if no monitor field is designated, conflict between the write requests from users A and B cannot be detected.

Components in a monitor field have dependency; a monitor field is set so that components have dependency. For this reason, if a plurality of write requests for monitor fields having the same last write time are received, the contents of these write requests are likely to be inconsistent. Therefore, of a plurality of write requests for monitor fields having the same last write time, only a write request that has arrived earliest must be permitted, and other write requests must be defined.

(Description of Process in Step S17 in FIG. 12: Terminal Y Allowed to Make Limited Edit Processes of Document Data)

For example, field-designated document data of "member address_book" information shown in FIG. 23 will be exemplified below. The document data shown in FIG. 23 has a document structure in which component (node) "address book" has a plurality of child components "member", each component "member" is made up of child components "name", "mail", and "company", and component "company" is made up of child components "company_name" and "department_name". Identification information of this document structure is "member address book".

A monitor field is set for each of components "name", "mail", and "company".

Assume that there are two different terminals X and Y.

Terminal X is granted permission to browse and edit all components "name", "address", "company_name", and "department_name". Terminal Y is granted permission to browse and edit components "name", "address", and "company_name", but is not granted permission to edit component "department_name" although it can browse that component.

In order to impose such limitation on terminal Y, for example, terminal Y preferably pre-stores information that designates a browse-only, non-editable component name corresponding to the above document structure ("browse-only component: (identification information of document structure: component)"). For example, in the above example, the document data edit unit 23 pre-stores data "browse-only component: (member address book: department name)".

When the user reads out the document data shown in FIG. 23 at terminal Y, terminal Y writes attribute information "browse-only="true"" that indicates a browse-only, non-editable component in component "department_name" before the user browses or edits the readout data at the document data edit unit 23.

A case will be examined below wherein a given person in the "member address book" information has switched companies, and the value of component "company_name" must be changed in an environment where both terminals X and Y are used. At this time, since terminal Y cannot edit component "department_name", the value of component "department_name" cannot be changed from terminal Y.

However, after an edit process for rewriting the value of component "company_name" is done at terminal Y, if the rewritten document data is browsed at terminal X, the value of component "company_name" has been changed, but the value of component "department_name" remains old. This readily causes misunderstanding.

Hence, when a write request is issued from terminal Y, incorrect data is preferably deleted rather than leaving it undeleted.

Components in a monitor field are dependent on each other, and if one of components in the monitor field has been changed, other components are likely to be changed accordingly.

However, a browse-only component in that monitor field cannot often be edited due to limitations on a terminal like terminal Y. For this reason, such browse-only component is preferably deleted rather than leaving inconsistent data undeleted.

Therefore, if the field comparison unit 224 of the difference document generation unit 22 finds as a result of comparison in a given monitor field that a given component has been changed, and a component with attribute information "browse-only" is present in the identical monitor field, it generates a difference document for deleting that component.

For example, assume that "yamada@taiyo-tusin.com" in the fourth line of the document data shown in FIG. 23 has been rewritten to "yamada@nihon-tusin.com", and "Taiyo Tusin" in the sixth line has been rewritten to "Nihon Tusin" in the edit process at terminal Y.

In this case, since the edit process has been made for two monitor fields, i.e., monitor fields of components "mail" and "company", two difference documents are generated. In a difference document for the monitor field of component "company", since component "department_name" is given attribute information "browse-only="true"", no tag "department_name" is present as items of the change contents in the difference document (see FIG. 24). This is because that tag is deleted upon generating the difference document in step S17 in FIG. 12 for the above reason.

As a result of execution of a write request generated based on the difference document shown in FIG. 24, the document data shown in FIG. 23 stored in the field-designated document data storage unit 12 is rewritten such that the value of component "company_name" in the sixth line in FIG. 23 is changed to "Nihon Tusin", and component "department_name" in the seventh line below "company_name" is deleted.

As described above, according to the above embodiment, a monitor field for controlling write accesses from a plurality of users is set for each field consisting of at least one component on the basis of the dependency of components in each of different document structures, and write accesses from the plurality of users are controlled for each monitor field of a structured document having the document structure set with such monitor fields. Hence, write requests from a plurality of users to each of a plurality of structured documents with different document structures can be efficiently and flexibly controlled in accordance with the document structure of each structured document.

When monitor fields are to be changed while the system is running, the monitor field designation change unit 23 can change the monitor fields of field-designated document data without suspending system operation.

In the above embodiment, a monitor field is set for each data range (partial document) made up of at least one of a plurality of components in a document structure. Furthermore, a plurality of monitor fields, which are designated as independent ones in a single structured document, can be combined into one monitor field. For example, in this case, after data ranges where monitor fields are set are designated as in the description of the above embodiment, identifiers are assigned to respective monitor fields. Upon assigning the identifiers, an identical identifier is assigned to a plurality of monitor fields to be combined into one monitor field (according to user's designation). Then, write control as in the above embodiment can be done while monitor fields with an identical identifier are considered as one monitor field.

A detailed explanation will be given taking as an example the following document data that describes the same "address book" information as in FIG. 29A in XML.

```
<address_book>
    <member>
        <name>Taro Tanaka</name>
        <address>Kawasaki-shi Saiwai-ku 3-chome</address>
        <telephone_number>045-522-5300</telephone_number>
    </member>
    <member>
        <name>Hanako Tanaka</name>
        <address>Kawasaki-shi Saiwai-ku 3-chome</address>
        <telephone_number>045-522-5300</telephone_number>
    </member>
    <member>
        <name>Kensuke Suzuki</name>
        <address>Yokahama-shi Kohoku-ku 2-chome</address>
        <telephone_number>044-233-2200</telephone_number>
    </member>
</address_book>
```

A case will be examined below wherein a monitor field is set for each component "member", i.e., each data range made up of components present below component "member" in the above document data, and the monitor fields made up of first and second components "member" from the top of data are combined into one monitor field. Attribute information "monitor$_{13}$ field="identifier"" is set in the start tag of each component "member" to indicate a monitor field. That is, an identifier of that monitor field is given as an attribute value. As a result, the monitor field designation unit 112 generates the following field-designated document data based on the above document data:

```
<address_book>
    <member monitor_field="A">
        <name>Taro Tanaka</name>
        <address>Kawasaki-shi Saiwai-ku 3-chome</address>
        <telephone_number>045-522-5300</telephone_number>
    </member>
    <member monitor_field="A">
        <name>Hanako Tanaka</name>
        <address>Kawasaki-shi Saiwai-ku 3-chome</address>
        <telephone_number>045-522-5300</telephone_number>
    </member>
    <member monitor_field="B">
        <name>Kensuke Suzuki</name>
        <address>Yokahama-shi Kohoku-ku 2-chome</address>
        <telephone_number>044-233-2200</telephone_number>
    </member>
</address_book>
```

By setting the monitor fields with those identifiers, the monitor fields can be set more finely. Hence, even when two tuples to which "Taro Tanaka" and "Hanako Tanaka" belong are to be changed to one monitor field since "Taro Tanaka" and "Hanako Tanaka" are married and live under the same house, as shown in FIG. 29A, such change can be easily done.

Furthermore, a monitor field can also be set by independently designating components to be monitored as one monitor field. In this case, an identical identifier of a monitor field is assigned to a plurality of components to be monitored as one monitor field.

For example, in case of the above field-designated document data, even when "Taro Tanaka" and "Hanako Tanaka" are married and live under the same house, one may want to register a home telephone number, and the other may want to register a portable phone number. In this manner, two components "telephone number" as child components of two components "member" assigned with identifier "A" may have no dependency with components "address". Therefore, components "telephone number" as child components of two components "member" assigned with identifier "A" can be set as monitor fields independent from those with identifier "A". That is, in this case, "C" and "D" are assigned to two components "telephone number" as identifiers of monitor fields, and the following field-designated document data is generated:

```
<address_book>
    <member monitor_field="A">
        <name>Taro Tanaka</name>
        <address>Kawasaki-shi Saiwai-ku 3-chome</address>
        <telephone_number monitor_field="C">045-522-5300</telephone_number>
    </member>
    <member monitor_field="A">
        <name>Hanako Tanaka</name>
        <address>Kawasaki-shi Saiwai-ku 3-chome</address>
        <telephone_number monitor_field="D">090-000-0000</telephone_number>
    </member>
    <member monitor_field="B">
        <name>Kensuke Suzuki</name>
```

-continued

```
        <address>Yokahama-shi Kohoku-ku
2-chome</address>
            <telephone_number>044-233-
2200</telephone_number>
        </member>
</address_book>
```

In this way, when monitor fields for write control are set for respective components of the document structure (i.e., a monitor field is set for each data range (partial document) made up of at least one component, a plurality of monitor fields are combined into one monitor field, and a monitor field is independently set for each component), monitor fields consisting of components with dependency can be finely and flexibly (variably) set. Therefore, when write control is made for respective monitor fields which are set delicately in this way, inconsistency (conflict) of the rewritten contents of document data can be perfectly prevented.

In the above embodiment, attribute information is assigned to set monitor fields in a document structure. However, the present invention is not limited to such specific case, but a monitor field range may be designated using tags. More specifically, a data range (partial document) to be set as a monitor field can be bounded by tags (e.g., tags "monitor field") used to designate the monitor field range. As in the above description, identifiers are assigned to respective monitor fields, and an identical identifier may be assigned to partial documents and components to be monitored as one monitor field. In such case, the identifier of each monitor field may be given as attribute information of component "monitor field". For example, in the following description example, attribute information "id="identifier of monitor field"" is described in the start tag of each monitor field.

```
<address_book>
<monitor field id="A">
    <member>
        <name>Taro Tanaka</name>
        <address>Kawasaki-shi Saiwai-ku
3-chome</address>
        <telephone_number>045-522-
5300</telephone_number>
    </member>
</monitor field>
<monitor field id="A">
    <member>
        <name>Hanako Tanaka</name>
        <address>Kawasaki-shi Saiwai-ku
3-chome</address>
        <telephone_number>0450-522-
5300</telephone_number>
    </member>
</monitor field>
<monitor field id="B">
    <member>
        <name>Kensuke Suzuki</name>
        <address>Yokahama-shi Kohoku-ku
2-chome</address>
        <telephone_number>044-233-
2200</telephone_number>
    </member>
</monitor field>
</address_book>
```

The method of the present invention described in the above embodiment may be stored in a recording medium such as a magnetic disk (floppy disk, hard disk, or the like), an optical disk (CD-ROM, DVD, or the like), a semiconductor memory, or the like, as a program that can be executed by a computer, and such recording medium can be distributed. More specifically, respective units of the field-designated document data management apparatus 1 except for the field-designated document data storage unit 12 and correspondence table 17, and respective units of the terminal 2 can be implemented as a program that can be executed by the computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer implemented write control method of exclusively controlling write requests from a plurality of user terminals to an identical structured document, wherein the identical structured document includes a plurality of elements each containing document content, the method comprising:
    setting a field information that indicates a monitor field in units of the elements within the identical structured document;
    storing the identical structure document in a storage device;
    reading out the identical structured document from the storage device in response to read-out requests from the user terminals, and outputting the document thereto;
    receiving a write request from the user terminals, the write request including a difference document and different field information that indicates a field in the identical structured document;
    determining if the write request is directed to the document content under monitoring by referral to the monitor field;
    denying the write request to prevent overwriting of the document content, if the document content has been rewritten by a previous write request; and
    writing the difference document extracted from the write request into the field indicated by the different field information of the identical structured document stored in the storage device, if the write request has not been denied.

2. The method according to claim 1, wherein said monitor field is set in a unit that exceeds sub-elements, the sub-elements having dependency relations with each other within the identical structured document.

3. The method according to claim 1, further comprising:
    storing a table in which a correspondence between an identity of a document structure of the structured document and a name of the element to which said monitor field is set is recorded.

4. The method according to claim 1, further comprising:
    using a time as a version number at which the document content in the monitor field was rewritten last; and
    checking the version number to which said one write request is directed.

5. A structured document management apparatus comprising:
    a storage configured to store a structured document which includes a plurality of elements each containing document content;

a setting device configured to set a field information that indicates a monitor field in units of the elements within the structured document;

a reader device configured to read out the structured document from the storage device in response to read-out requests from user terminals, and to output the document thereto;

a receiver device configured to receive a write request from the user terminals, the write request including a difference document and different field information that indicates a field in the structured document;

a determining device configured to determine if the write request is directed to the document content under monitoring by referral to the monitor field; and a request handler device configured to deny the write request to prevent overwriting of the document content, if the document content has been rewritten by a previous write request; and a writer device configured to write the difference document extracted from the write request into the field indicated by the different field information of the structured document stored in the storage device, if the write request has not been denied.

6. The apparatus according to claim 5, wherein said monitor field is set in a unit that exceeds sub-elements, the sub-elements having dependency relations with each other within the structured document.

7. The apparatus according to claim 5, wherein the storage stores a table in which a correspondence between an identity of a document structure of the structured document and a name of the element to which said monitor field is set is recorded.

8. The apparatus according to claim 5, wherein the handling device uses a time at which the document content in the monitor field was rewritten last as a version number, and checks the version number to which said one write request is directed.

9. A computer program product embodied on a computer readable medium for exclusively controlling write requests from a plurality of user terminals to an identical structured document, wherein the identical structured document includes a plurality of elements each containing document content, comprising:

a code segment that sets a field information that indicates a monitor field in units of the elements within the identical structured document;

a code segment that instructs a storage device to store the identical structured document;

a code segment that reads out the identical structured document from the storage device in response to read-out requests from the user terminals, and outputs the document thereto;

a code segment that receives a write request from the user terminals, the write request including a difference document and different field information that indicates a field in the identical structured document;

a code segment that determines if the write request is directed to the document content under monitoring by referral to the monitor field;

a code segment that denies the write request to prevent overwriting of the document content, if the document content has been rewritten by a previous write request; and a code segment that writes the difference document extracted from the write request into the field indicated by the different field information of the identical structured document stored in the storage device, if the write request has not been denied.

* * * * *